United States Patent Office 3,410,368
Patented Nov. 12, 1968

3,410,368
AUTOMATIC FLOOR-STOPPING SYSTEMS OF
ELEVATOR CAGES AT SUPPLY FAULTS
Isao Inuzuka, Katsuta-shi, Japan, assignor to Hitachi, Ltd.,
Chujoda-ku, Tokyo, Japan, a corporation of Japan
Filed Nov. 23, 1964, Ser. No. 413,147
Claims priority, application Japan, Nov. 27, 1963,
38/63,271
4 Claims. (Cl. 187—29)

ABSTRACT OF THE DISCLOSURE

An automatic floor-stopping system that operates upon the occurrence of a power supply fault for use in controlling the operation of an elevator control system having a prime mover driven from an electric power supply by a Ward-Leonard motor-generator control apparatus that includes an exciter operated by the prime mover. A speed control circuit is energized by the output from the exciter to control the Ward-Leonard control apparatus which in turn drives the elevator cage. The system includes a power supply-fault detector for detecting a power supply fault and control circuitry for normally controlling the speed control circuit to cause the same to stop the Ward-Leonard control apparatus in response to a power supply fault. An additional over-riding control is provided which is responsive to the power supply fault detector for causing the speed control circuit to maintain operation of the Ward-Leonard control apparatus due to inertial energy stored in the apparatus and the cage even after the output voltage of the exciter decreases due to the power supply fault. The system is completed by stopping devices for stopping the cake at a predetermined floor level in the direction of the previous cage travel so that the elevator cage is caused to reach a predetermined floor by virtue of inertial energy stored in the elevator control apparatus and the cage after the occurrence of a power supply fault.

---

This invention relates to an automatic control system for elevator cages or cars that is capable of stopping the latter at a neighbouring floor level when electric supply is accidentally interrupted.

An object of the present invention is to provide an automatic control system of the kind specified for utilizing inertial energy in the elevator drive, when the electric supply is accidentally interrupted, to effect the normal deceleration and stopping operation to the neighbouring floor level, as well as the normal door opening operation at the floor level.

Another object of the present invention is to provide an automatic control system of the kind specified for assuring opening of the cage door as well as floor gate when the electric supply is accidentally interrupted before the cage starts from a floor.

Figure 1:
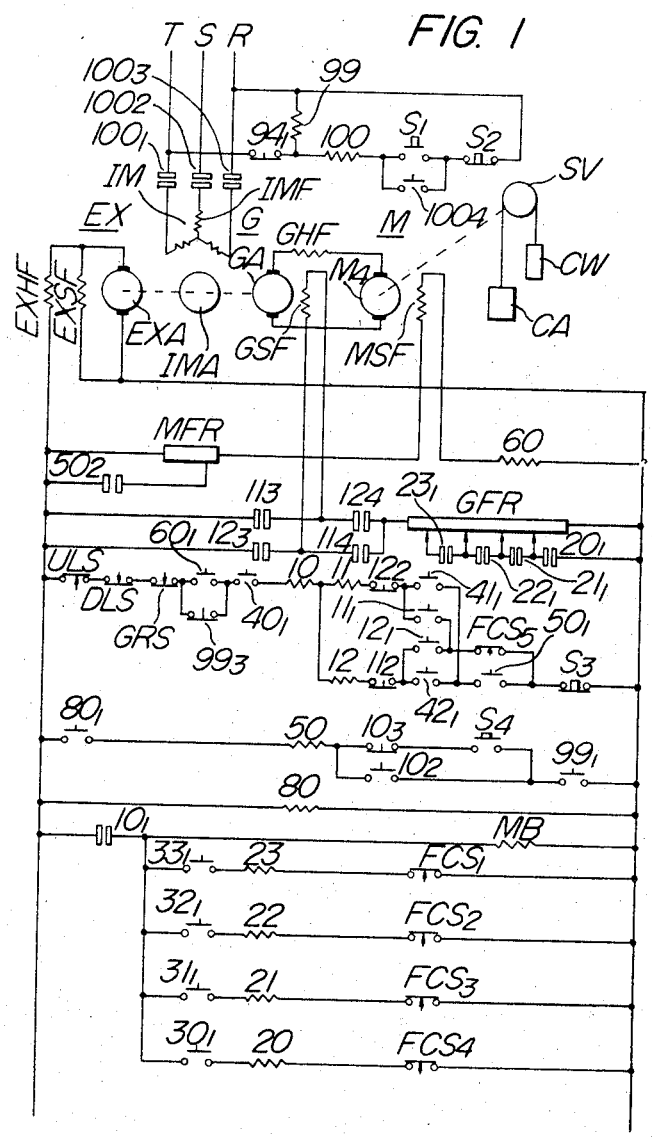
Figure 2:
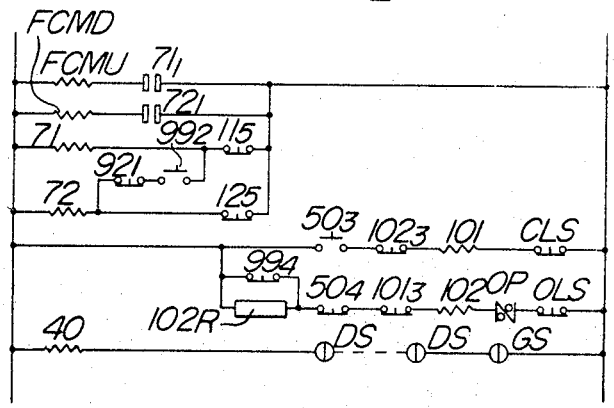
Figure 3:
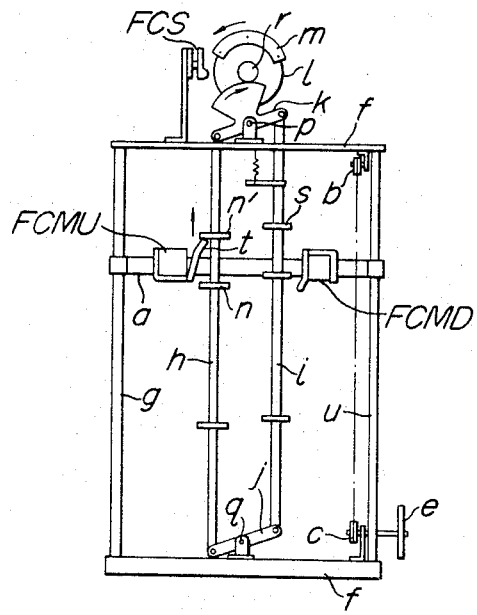

There are other objects and particularities of the present invention which will be made obvious from the following detailed description of the invention, when considered with reference to the accompanying drawings, in which:

FIGS. 1 and 2, in combination, show diagrammatically an embodiment of the present invention; and FIG. 3 shows a switch mechanism for deceleration control in the system shown in FIGS. 1 and 2.

Referring to the accompanying drawings, the elevator system comprises a D.C. electric motor M for driving a sheave SV which, in turn, drives an elevator cage CA and a counterweight CW, as usual. The electric motor M is connected in loop circuit with a D.C. generator G to form a Ward-Leonard system, the rotor GA of generator G being driven by a three-phase induction motor IM, the rotor IMA of which also drives an exciter EX for supplying exciting power to generator G, motor M, as well as control currents to door motors, control relays and contactors, etc., in the whole system.

Various relays, switches, resistors, and other important parts, employed in the system shown are designated by the following reference characters, respectively:

$S_1$—motor-generator start button.
$S_2$—motor-generator stop button.
$S_3$—emergency stop button.
$S_4$—elevator start button.
MFR—shunt-field series resistor of motor M.
GFR—separate-field series resistor of generator G.
MB—electromagnetic brake.
OP—floor-stop detecting contacts.
$FCS_1$–$FCS_5$—deceleration control switches.
FCMU—up-direction deceleration magnet.
FCMD—down-direction deceleration magnet.
DS, GS—door switches.
CLS—door-closing limit switch.
OLS—door-opening limit switch.
ULS—up-travel limit switch.
DLS—down-travel limit switch.
10—running contactor.
11—up-run contactor.
12—down-run contactor.
20–23—acceleration contactors.
40—door contactor.
50—door main contactor.
60—current relay.
71—up-direction deceleration contactor.
72—down-direction deceleration contactor.
80—voltage relay.
99—supply-fault detecting relay.
100—induction motor starting contactor.
101—door closing contactor.
102—door opening contactor.
102R—series resistor for door opening contactor.

Normal operation of the elevator system shown in FIGS. 1 and 2 will first be described.

When the motor-generator start button $S_1$ is depressed, with the three-phase supply line T–S–R energized, a circuit is completed as follows:

$$R–S_2–S_1–100–94_1–T$$

The induction motor starting contactor 100 is thus energized to close its three phase contacts $100_1$, $100_2$ and $100_3$, and the induction motor IM is started. The start button $S_1$ is shunted by another contact $100_4$ of contactor 100 for establishing a self-holding circuit.

The rotor IMA of induction motor IM is coaxially coupled with the excitor armature EXA having a self-exciting shunt field winding EXSF. The excitor EX generates D.C. voltage which rises to the rated voltage after several seconds. Thereupon, the voltage relay 80 is energized to close its contacts $80_1$, and the elevator is now ready for operation.

When the elevator start button $S_4$ is depressed, a circuit is completed as follows:

$$P-80_1-50-10_3-S_4-99_1-N$$

Contacts $99_1$ are kept closed as far as the A.C. supply source is in the normal condition. The door main contactor 50 is thus energized to close its contacts $50_3$ for establishing the following circuit:

$$P-50_3-102_3-101-CLS-N$$

The door closing contactor 101 is thus energized, and controls a door driving motor, known per se, as usual, to effect door closing operation, until the door-closing limit switch CLS is opened, whereupon the door closing contactor 101 is deenergized to finish the door closing operation. Upon complete closure of the door, door switches DS and GS are closed to energize the door contactor 40 for closing its contacts $40_1$.

On the other hand, the closure of door main contactor contact $50_2$ short circuits a portion of the series resistor MFR of shunt field winding MSF of motor M, for establishing sufficient field magnetic flux to have the motor M produce an ample rotating torque. At the same time, the current relay 60 is energized to close its contacts $60_1$.

Let it be assumed that a cage call button or a floor call button is depressed to energize an up-travel selecting contactor 41. Then, the following circuit is established:

$$P-ULS-DLS-GRS-60_1-40_1-10-11-12_2-41_1-50_1-S_3-N$$

The running contactor 10 and the up-run contactor 11 are thus energized. It is to be noted that the up-travel limit switch ULS, the down-travel limit switch DLS, an overspeed detecting switch GRS, and the emergency stop button $S_3$ are kept closed normally.

The energization of up-run contactor 11 closes its contacts $11_1$ to establish a self-holding circuit as follows:

$$P-ULS-DLS-GRS-60_1-40_1-10-11-12_2-11_1-FCS_5-S_3-N$$

In addition, the contacts $11_3$ and $11_4$ are also closed to complete the following circuit:

$$P-11_3-GSF-11_4-GFR-N$$

The generator separate field winding GSF is thus energized, and the generator G produces D.C. voltage for rotating the motor M in the direction to effect upward run of cage CA.

On the other hand, the energization of running contactor 10 closes its contacts 10 to energize the electromagnetic brake MB for releasing the brake to permit the rotation of motor M.

For effecting smooth and comfortable acceleration of the cage, acceleration control contacts $30_1$, $31_1$, $32_1$, $33_1$, known per se, are closed sequentially as usual, for energizing acceleration contactors 20, 21, 22, 23, sequentially, to short circuit corresponding portions of the series resistor GFR of generator separate field winding GSF, successively, for raising the D.C. voltage generated to accelerate the motor M up to the rated speed.

When the elevator cage CA has arrived at a predetermined distance from the floor level at which the cage is called to stop, a known deceleration instructor contactor, not shown, is energized as usual, to open its contacts $92_1$. The up-direction deceleration contactor 71, having been energized by a circuit $P-71-99_2-92_1-12_5-N$, is thus deenergized to open contacts $71_1$ for deenergizing the up-direction deceleration magnet FCMU. The down-direction deceleration contactor 72 is held energized by closure of contacts $12_5$ of down-run contactor 12 which is now held deenergized, in spite of opening of deceleration instructor contacts $92_1$.

It will readily be understood that similar but down-direction operation will take place, when a cage call button or a floor call button is depressed to energize a down-travel selecting contactor 42.

The up-direction deceleration magnet FCMU and the down-direction deceleration magnet FCMD are mounted fixed on an arm $a$ as shown in FIG. 3, and the arm $a$ is fixed to a portion of an endless chain $d$ meshing with sprocket wheels $b$ and $c$ having their shafts mounted on a framework $f$. The sprocket $c$ is coupled to a sprocket $e$ through a common shaft, and the sprocket $e$ is operatively connected to the cage CA through a chain, not shown, so as to be rotated by virtue of travel of the cage CA. Accordingly, the travel of cage CA is transmitted to the arm $a$ through the endless chain $d$ at a speed reduced by sprockets $e$ and $c$. The arm $a$ is guided by supporting columns $g$ and $u$, and travels within a reduced range but in proportion to the travel of cage CA.

The framework $f$ carries a sector-shaped gear $k$ and a rod $j$ pivotally mounted on stationary pins $p$ and $q$, respectively, and bars $h$ and $i$ connect opposite ends of gear $k$ and rod $j$, respectively, by pivotal connections, thus forming a parallelogram. The bar $h$ carries a number of engagement pieces $n$, one for each floor at an appropriate distance from the imaginary floor level for initiating upward deceleration to the floor stop of cage CA, while the bar $i$ carries similar engagement pieces $s$ for downward deceleration to floor stops.

When the magnet FCMU is deenergized as mentioned hereinbefore, it releases its armature pawl $t$, and the latter is projected into the path of engagement piece $n$. As the cage CA moves upwardly the arm $a$ is shifted upwardly, and at last, the pawl $t$ comes to engage the corresponding engagement piece $n'$. After then, the bar $h$ is lifted along with the upward movement of arm $a$. The upward movement of bar $h$ rotates the sector gear $k$ in the clockwise direction in FIG. 3, with a pinion $r$ meshing therewith being rotated counterclockwisely.

The pinion $r$ carries a cam block $l$ and five cams $m$ of which only one is shown in FIG. 3. The cams $m$ effect circular movements along with the rotation of pinion $r$. The framework $f$ carries five deceleration control switches FCS, only one being shown in FIG. 3, corresponding to the five cams $m$, respectively. These switches are shown in FIG. 1 as $FCS_1$, $FCS_2$, $FCS_3$, $FCS_4$, $FCS_5$, and are opened by respective cams $m$ when the cage CA reaches respective predetermined distances from the floor level where the cage CA is to stop. These switches, of course, may be positioned respective predetermined distances apart from each other not only between neighboring floors but also between one floor and every other floor or every third floor, etc.

It will now be understood that, after the deceleration instructor contactor 92 is energized, deceleration switches $FCS_1$, $FCS_2$, $FCS_3$ and $FCS_4$ are opened successively for deenergizing acceleration contactors 20, 21, 22 and 23, respectively. The series resistance GFR of generator separate field winding circuit is successively increased to drop the generator voltage for lowering the upward speed of cage CA. When the deceleration control switch $FCS_5$ is opened, the running contactor 10 and the up-run contactor 11 are deenergized. The deenergization of contactor 10 opens its contacts 10 for deenergizing the electromagnetic brake MB to effect mechanical braking, and the cage CA comes to stop at the predetermined floor level.

The deenergization of up-run contactor 11 opens its contacts $11_3$ and $11_4$ for deenergizing the generator separate field winding GSF to render the generator voltage zero. The deenergization of contactor 10 also opens its contacts $10_2$ for opening the following energizing circuit for door main contactor 50 to close its contacts $50_4$:

$$P-80_1-50-10_2-99_1-N$$

When the cage CA has arrived at the floor level and come to stop, contacts OP are closed and the following circuit is established:

$$P-102R-50_4-101_3-102-OP-OLS-N$$

and the door opening contactor 102 is energized. The energized contactor 102 takes control of the door motor to continue the door opening operation until the door-opening limit switch OLS is opened, the door opening operation being completed when the door opening contactor is deenergized by opening of limit switch OLS. The opening of door main contactor contacts $50_2$ increases the series resistance MRF of the motor shunt field winding circuit for preventing temperature rise of motor M during the floor stop.

If the A.C. supply R–S–T should accidentally be interrupted, the induction motor IM would lose its magnetic field, and the rotor IMA would continue its rotation by the mechanical energy stored therein, and finally come to stop.

The voltage generated by the excitor EX drops along with the rotating speed of excitor EX, and when the voltage drops to about 80% rated voltage, the voltage relay 80 is deenergized to open its contacts $80_1$. The door main contactor 50 is thereby deenergized to open its contacts $50_2$ for increasing the series resistance MFR of motor field winding circuit MSF. By decrease of the field current, the current relay 60 is deenergized.

The deenergization of relay 60 opens its contacts $60_1$ for deenergizing the running contactor 10 and the up-run contactor 11, contacts $11_3$ and $11_4$ being thereby opened. The generator separate field exciting current is thus interrupted, and the generator voltage drops promptly. At the same time, the deenergized contactor 10 opens its contacts $10_1$ to deenergize the electro-magnetic brake MB for applying brake to the motor M to stop the cage CA.

The position of cage CA relative to the neighbouring floor level when it has come to stop is determined by the relative position of cage CA at the instant when the supply R–S–T is interrupted, as well as the amount of energy stored in the induction motor IM and associated parts, and the cage CA might otherwise come to stop at other than the floor level.

According to the present invention, however, the cage CA is assured to come to stop at the neighbouring floor level in the direction of travel, even in the case of accidental interruption of A.C. supply. In the embodiment of the present invention shown in FIGS. 1, 2 and 3, a supply-fault detecting relay 99 is provided, which is deenergized when the A.C. supply is interrupted. The deenergization of relay 99 closes its contacts $99_3$ in shunt with current relay contacts $60_1$, and the running contactor 10 and the up-run contactor 11 are kept energized, in spite of the deenergization of current relay 60. Thus, the cage CA continues its run by the inertial energy stored therein. On the other hand, the opening of contacts $99_2$ of deenergized supply-fault detecting relay 99 deenergizes the up-direction decelerating contactor 71, assuming that the cage CA is running upwardly, for effecting the operation of decelerating apparatus shown in FIG. 3. That is to say, when the supply-fault is detected, the up-direction deceleration magnet FCMU is deenergized to release the pawl $t$, which in turn engages the engagement piece $n$ for a predetermined floor, for example the neighbouring floor in the upward direction, to operate the deceleration control switches for causing the cage CA to decelerate and come to stop.

The opening of contacts $99_1$ of the deenergized relay 99 deenergizes the door main contactor 50 to close its contacts $50_4$ to prepare the energizing circuit of door opening contactor 102. The supply-fault detecting relay 99 is also provided with contacts $99_4$ which is closed when the relay 99 is deenergized to short circuit the under-voltage protecting series resistor 102R for the door opening contactor 102. This assures the energization of door opening contactor 102, in spite of the lowering of excitor voltage due to consumption of the stored energy until the cage CA arrives at the floor level.

When the cage CA has arrived at the floor level, the following circuit is completed to energize the door opening contactor 102 for opening the cage door:

$$P-99_4-50_4-101_3-102-OP-OLS-N$$

The A.C. supply might be interrupted accidentally before the cage CA starts from a floor level after it stopped thereat.

When the start button $S_4$ is depressed for starting the cage CA, and the door contactor 50 is energized as mentioned hereinbefore, the door closing circuit is established to energize the door closing contactor 101, and the door closing operation is commenced.

If the A.C. supply should be interrupted accidentally at that time, the supply-fault detecting relay 99 would be deenergized to open its contacts $99_1$, the door main contactor 50 being thereby deenergized to interrupt the door closing operation. The contactor 50 then closes its contacts $50_4$ for completing the energizing circuit of door opening contactor 102 as follows:

$$P-99_4-50_4-101_3-102-OP-OLS-N$$

The cage door is thus opened.

The above-described operation upon an A.C. supply fault is also caused to take place when other protecting devices, such as an overload detecting relay 94 (not shown), is operated to open its contacts $94_1$.

It is to be noted that the generator G is also provided with a series field winding GHF, while the excitor EX is also provided with a series field winding EXHF.

It will have been understood that, according to the present invention, when A.C. supply is accidentally interrupted during the running of elevator cage, the cage is caused to decelerate and come to stop at the neighbouring floor level in the direction of run by the normal decelerating and stopping provisions, and the door is opened. In addition, when the A.C. supply fault has occurred before the cage starts from a floor level after a stop thereat, the door closing operation is interrupted and the door is opened. This assures that passengers in the elevator cage can go out safely and promptly, even when the A.C. supply is interrupted accidentally, such as by fire or other emergency.

What is claimed is:

1. An automatic floor-stopping system that operates upon the occurrence of power supply faults for use in association with an elevator control system having a prime mover driven from an electric power supply, a motor-generator control apparatus including an exciter operated by said prime mover, a speed control circuit energized by the output of the exciter to control said motor-generator control apparatus, and an elevator cage driven by said motor-generator control apparatus, the system being characterized by power supply-fault detecting means for detecting a power supply-fault, means responsive to the power supply fault for normally controlling said speed control circuit to cause the same to stop the motor-generator control apparatus in response to a power supply-fault, means responsive to the power supply-fault detecting means for controlling said speed control circuit to cause the same to maintain operation of the motor-generator control apparatus due to inertial energy stored in the apparatus and cage even after the output voltage of said exciter decreases due to the power supply-fault, and means for stopping the cage at a predetermined floor level in the direction of the previous cage travel whereby the elevator cage is caused to reach a predetermined floor by virtue of inertial energy stored in the elevator control apparatus and the cage.

2. An automatic floor stopping system according to claim 1 wherein the means for normally controlling the speed control circuit to cause the same to stop the motor-generator control apparatus in response to a power-supply fault comprises a part of said speed control circuit and includes means for stopping energization of said speed control circuit from said exciter when the output voltage of the exciter decreases to a predetermined value and said means for maintaining the operation of the motor-generator control apparatus prevents said stopping of energization from the exciter when a power supply-fault is detected.

3. An automatic floor-stopping system according to claim 1 wherein said elevator control system further comprises means for controlling said speed control circuit in response to registered landing calls and car calls and means responsive to the power supply-fault for overriding control of said speed control circuit to cause the elevator control system to stop the elevator independently of registered calls.

4. The automatic floor stopping system according to claim 1, in which means are provided for interrupting the cage door closing operation and effecting the cage door opening operation upon a power supply faults occurring before the cage starts from a floor level at which the cage normally stopped.

References Cited

UNITED STATES PATENTS

| | | | |
|---|---|---|---|
| 2,701,033 | 2/1955 | Chiselbrook | 187—29 |
| 2,795,296 | 6/1957 | Suozzo | 187—29 |
| 2,968,364 | 1/1961 | Robertson | 187—29 |
| 3,144,917 | 8/1964 | Tressel | 187—29 |

ORIS L. RADER, *Primary Examiner.*

THOMAS E. LYNCH, *Assistant Examiner.*